United States Patent [19]

Topper et al.

[11] Patent Number: 4,833,526
[45] Date of Patent: May 23, 1989

[54] THREE DIMENSIONAL NON-ADAPTIVE DECODER FOR A PAL COLOR TELEVISION COMPOSITE SIGNAL

[75] Inventors: Robert J. Topper, Hatboro, Pa.; Lee R. Dischert, Medford, N.J.

[73] Assignee: Matsushita Electric Industrial Co., Ltd., Kadoma, Japan

[21] Appl. No.: 178,526

[22] Filed: Apr. 7, 1988

[51] Int. Cl.$^4$ .............................................. H04N 9/78
[52] U.S. Cl. ...................................................... 358/21
[58] Field of Search .................................... 358/31, 24

[56] References Cited

U.S. PATENT DOCUMENTS

| 4,597,007 | 6/1986 | Reitmeier et al. | 358/31 |
| 4,684,977 | 8/1987 | Dischert et al. | 358/31 |

FOREIGN PATENT DOCUMENTS

| 114686 | 7/1983 | Japan | 358/24 |
| 19387 | 1/1985 | Japan | 358/31 |
| 2173971 | 10/1986 | United Kingdom | 358/31 |

Primary Examiner—John W. Shepperd
Attorney, Agent, or Firm—Amster, Rothstein & Ebenstein

[57] ABSTRACT

Apparatus for decoding a luminance signal from a PAL composite signal comprising a summing one line delay for deriving the sum of corresponding pixels on adjacent lines of a field, a subtracting one line delay for driving the difference between pixels respectively adjacent to said pixels occur in another frame, an inverter for inverting the polarity of the output of said subtracting one line delay at twice the frequency of the color subcarrier, an adder coupled to said summing one line delay and to said subtractor, a two line delay coupled to the latter adder and another adder coupled to the opposite ends of said two line delay.

9 Claims, 2 Drawing Sheets

FLD (-2)

| | | | | | | P6 | P1 |
|---|---|---|---|---|---|---|---|
| L1 | -U | -V | +U | +V | -U | (-V) | (+U) |
| L3 | -V | -U | +V | +U | -V | (-U) P7 | (+V) |
| L5 | +U | +V | -U | -V | +U | +V P2 | -U |
| L7 | +V | +U | -V | -U | +V | +U | -V |

Fig.1A.

FLD (-1)

| | | | | | | | P3 |
|---|---|---|---|---|---|---|---|
| L2 | +V | +U | -V | -U | +V | +U | (-V) |
| L4 | -U | -V | +U | +V | -U | -V | -U |
| L6 | -V | -U | +V | +U | -V | -U | +V |
| L8 | +U | +V | -U | -V | +U | +V | -U |

Fig.1B.

FLD (0)

| | | | | | P8 | P4 | |
|---|---|---|---|---|---|---|---|
| L1 | -V | -U | +V | +U | (-V) | (-U) | +V |
| L3 | +U | +V | -U | -V | (+U) P9 | (+V) | -U |
| L5 | +V | +U | -V | -U | +V | +U P5 | -V |
| L7 | -U | -V | +U | +V | -U | -V | +U |

Fig.1C.

THREE DIMENSIONAL NON-ADAPTIVE DECODER FOR A PAL COLOR TELEVISION COMPOSITE SIGNAL

BACKGROUND OF THE INVENTION

In a television system, the composite signal that is modulated onto a radio frequency carrier wave is comprised of video signals obtained by scanning the scene to be televised along successive parallel lines of a first field and thenalong parallel lines of a second field that are interleaved with the lines of a first field to create what is called a frame. The lines of the respective fields of successive frames occur in the same place so that the video signals along the lines owuld be identical if there were no changes in the scene. Line synchronizing signals associated with each line and field synchronizing signals associated with each field are included for the purpose of causing the beam of a cathode ray tube of a monochrome receiver or the beams of a cathode ray tube of a color television receiver to scan their phosphorized inner faces in the same pattern of lines and fields.

In monochrome T.V. systems, the video signal is a luminance signal within a frequency band at six megacycles, and, as is well known, the fineness of detail that can be represented increases with frequency. In PAL (phase alternate line) color T.V. systems, the color information is conveyed by a color subcarrier that is superimposed onto the luminance signal at about 4.4 megacycles. Although the frequency of the subcarrier with respect to the line scanning frequency of 15.625 KHz is chosen such that it comes up out of phase after a given number of frames so as to tend to cancel its effect on luminance and therefore be less visible on monochrome receivers as well as color receivers, the subcarrier is still visible on receivers producing luminance signals within the frequency band occupied by the color subcarrier and its sidebands. One way of avoiding this problem is to gradually lower the response to the luminance signal to a very low value at the frequencies of the subcarrier components, but this reduces the fineness of the detail that can be displayed.

In order to permit higher frequencies of the luminance signal to be used and therefore to provide more detail in the image, comb filters have been employed to remove the energy introduced into the luminance signal by the presence of the color subcarrier. They are called comb filters because subcarrier energy occurs at uniformly spaced frequencies.

In the PAL color television system, the color subcarrier generated by combining the amplitude modulations of its 0° and 90° phases with R-Y and B-Y color difference signals respectively is added to a Y luminance signal.

The ratio between the frequency of the color subcarrier and the frequency at which the lines are scanned is such that 283.75 cycles occur during a line scanning interval so that the carrier shifts by 90° with respect to each successive line. Since each quadrature phase represents a different color difference signal, it is customary to refer to them as pixels distributed along a line. Assuming sampling at four times the subcarrier frequency, there are 1135 pixels in each line, each of which represents a quadrature phase. The table below indicates the phase shifts for different numbers of lines, H.

1 pixel=90°
1 H=90°
2 H=180°
312 H=180°
1 frame=625 H=90°
1 frame+1 pixel=180°

As a matter of terminology, combs that use data from only one field are referred to as 2D combs and combs that use data from two or more fields are called 3D combs.

Decoders that change their mode of operation in response to the video signal are known as adaptive decoders. Whereas they can obtain excellent results, there are situations where they flip back and forth between modes so as to produce very poor results. For this reason, non-adaptive decoders that use the same mode of operation regardless of the video signal are preferable even though their results may not be as good as an adaptive filter at its best.

BRIEF SUMMARY OF THE INVENTION

This invention is a decoder of the 3D type, and it operates so as to greatly reduce the effect of the color subcarrier in the Y or luminance signal decoded from a PAL composite signal. Briefly stated, the decoder operates as follows.

As previously noted, the composite signal may contain luminance frequencies up to 6 megacycles and a modulated color subcarrier at 4.43 MHz that may have sidebands between 3 and 6 MHz. The composite signal is applied to a field that produces frequencies above 2.5 MHz at one output and frequencies below 2.5 MHz at another with some overlap. Common frequencies at each output are complementary so as to produce the same amplitude when combined that they had in the composite signal.

The high frequencies are applied to a one line summing comb that produces the sum of the color difference signals and the high frequency luminance signals Yh appearing at the same pixels in adjacent lines of a field. Whereas the Yh signals from the pixels can be the same or nearly so, there is a difference in the color difference signals at these pixels because of the 90° shift of the subcarrier on the adjacent lines.

The high frequencies Yh at the output of the filter are also coupled to a one-line difference comb via a delay of one frame plus (or minus) one pixel. In either case the signal applied to the difference comb is out of phase with the color difference signal from the summing comb. For reasons to be explained, the 180° out of phase condition is only attained if the output polarity of the difference comb is alternated at a rate that is twice the frequency of the color subcarrier. The fact that the signal applied to the difference comb is from a pixel next to the one supplied to the summing comb makes little difference because of the low bandwidth of the chroma signal.

When there is no movement between frames, the summing of the outputs of the summing and difference combs causes the color difference signals to cancel so as to leave the high frequencies Yh of the luminance signal. But when movement occurs, the color difference signals at the outputs of the summing and difference combs may not cancel because they come from different frames. This would produce artifacts from uncancelled subcarrier.

In order to reduce this residual subcarrier, the signal obtained from summing the output of the summing comb and the difference comb is applied to a 2H summing comb. A wideband Y signal is obtained by adding the low frequencies from the input signal to the output of the 2H summing comb.

BRIEF DESCRIPTION OF THE DRAWINGS

FIG. 1A, FIG. 1B and FIG. 1C respectively show the color signals in a number of the same pixels of first, second and third sequential fields.

DETAILED DESCRIPTION OF THE INVENTION

Figure 1:
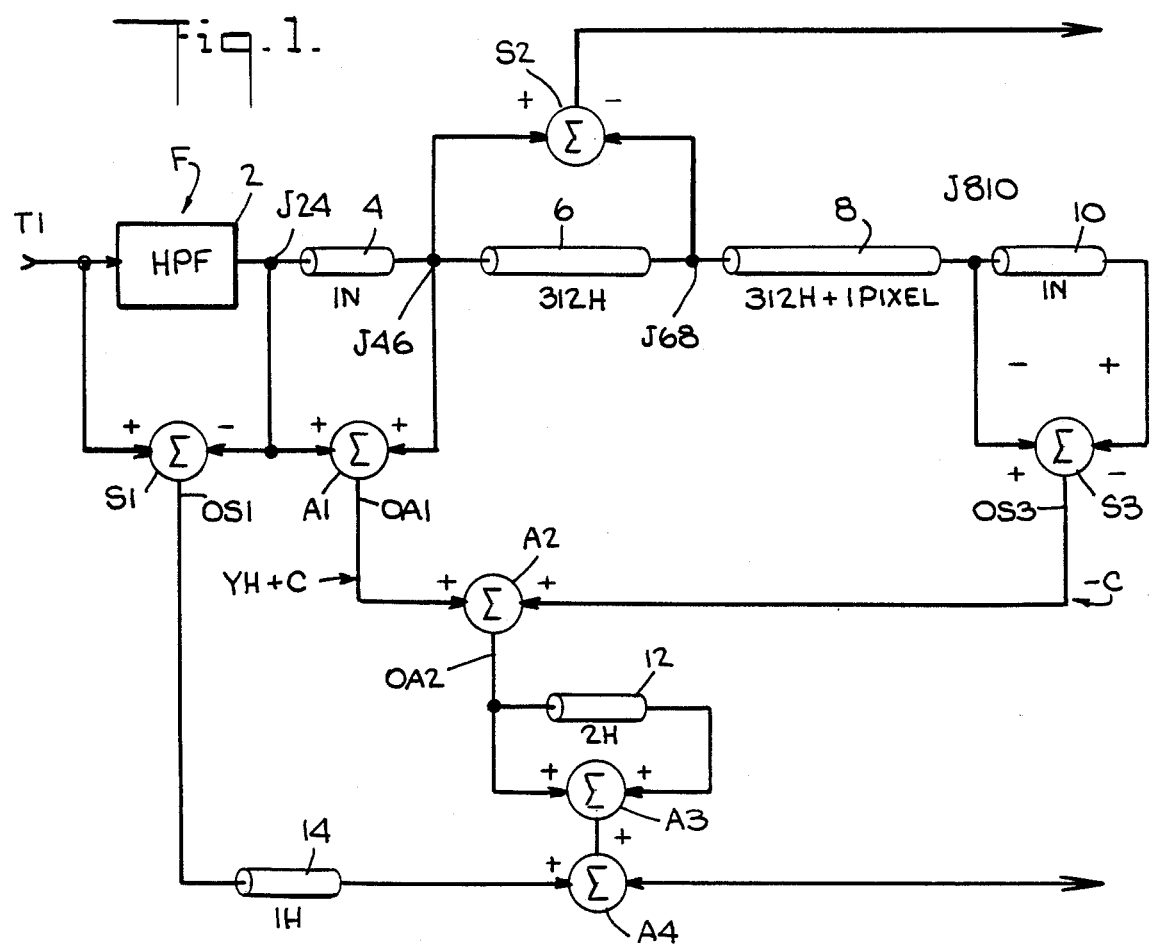
FIG. 1 is a schematic drawing illustrating the operation of this invention.

In FIG. 1 a composite PAL video signal is to be applied to an input terminal T1. A high pass filter 2, a 1H delay 4, a 312H delay 6, a delay 8 of 312H plus or minus 1 pixel and a 1H delay 10 are connected in series in the order named to the input terminal T1 so as to meet at junctions J24, J46, J68 and J810 respectively as shown.

The high pass filter 2 permits the higher frequencies of the composite video signal including the high frequency luminance signal Yh and the sidebands of the color subcarrier to pass to the junction J24. By coupling the inputs of a subtractor S1, to opposite ends of the high pass filter 2 so as to subtract its output from its input, the low frequencies of the composite signal may be made to appear at the output OS1 of S1. The high pass filter 2 and the subtractor S1 connected as shown form a filter that outputs high video frequencies to the output connected to J24 and low video frequencies to its output OS1 that are complementary.

FIGS. 1A, 1B and 1C illustrate the color signals in corresponding portions of four consecutive lines of successive fields. Fields FLD(−2) and FLD(0) are corresponding fields of different frames so that the lines are the same. The line numbers are as they would appear in interleaved order. The earliest field is FLD(−2), the next field is FLD(−1) and the current field is FLD(0). The U and V letters mean the following:

−U = −(B−Y) at 270°
−V = −(R−Y) at 180°
+U = B−Y at 90°
+V = R−Y at 0°

Note that the color difference signals advance by 90° on each successive line.

A summing color is formed by connecting the inputs of an adder A1 to opposite ends of the delay 4, i.e. to J24 and J46, so as to provide at its output OA1 the sum of the Yh signals appearing in vertically corresponding pixels such as P1 and P2 in the successive lines of a field and color signals C that are the sum of the color signals +U, +V at these same pixels. The delay 4 and the delays to be referred to could be analog delay lines, but in preferred embodiments they would be digital delays in which signals are stored in memory and then read out, the delay being the time between writing a signal into a memory and reading it out.

Although the color signals can be decoded in other ways, they can be derived by connecting the inputs of a subtractor S2 to the ends of the 312H delay 6, i.e. to the junctions J46 and J68 at which the color signals are 180° out of phase so that subtraction effectively adds them and produces the color signal at a terminal T2. Thus if P2, which is a +V is at J46, a pixel P3 which is −V would be at J68.

A difference comb is formed by connecting the inputs of a subtractor S3 to opposite ends of the delay 10, i.e. to J810 and the output of the delay 10 via a switch 11 that reverses the connections at each half cycle of a color subcarrier oscillator 0 found at any receiver.

If it be assumed that the pixel P1 = +U and P2 = +V are respectively at the right and left ends of the delay 10 and that the subtractor S3 subtracts P2 from P1 as indicated by the set of + and − signs above S3, the output OS3 of the difference comb will be P1−P2 or +U−V. If the delay at the junction J810 is one frame + one pixel, the pixels P4 = −U and P5 = +V of the field FLD(0) shown in FIG. 1C will respectively appear at the junctions J46 and J24, and the output OA1 of the summing comb will be −U +V so that the output OA2 of the adder will be just Yh. Thus the color difference signals cancel.

When the next previous pixels P6 = −V and P7 = −U were respectively at the outputs of the delay 10 and J8,10, the pixels P8 = −V and P9 = +U were at the output OA1 so that if P7 were subtracted from P6, the output of the subtracting comb at OS2 would be −V,+U and would not cancel the −V,+U at the output OA1 of the summing comb A. Therefore, the polarity of the output of the subtracting comb would have to be inverted so as to be +V,−U. Thus it is necessary to invert the polarity of the subtracting comb at twice the subcrrier frequency, i.e., for every other pixel. This is done by the switch 11 as indicated by the plus and minus signs below S3 or by inserting a switchable inverter in the output OS3.

The same kind of analysis will show that the cancellation can be made to occur in a similar manner if the delay 8 is 312H minus one pixel.

The cancellation that takes place in the adder A2 as just described depends on the chroma components applied to the inputs of A2 being identical and 180° out of phase, but if there is motion having a vertical chroma component in the scene being televised, this may not occur so that color signals would contaminate the high frequency luminance signal Yh appearing at the output OA2 of the adder A2. In order to reduce these color components, a 2H delay 12 is connected to OA2, and inputs of an adder A3 are respectively connected to OA2 and the output of the delay 12 so as to form a 2H summing comb. The color components applied to the inputs of the adder A3 will be 180° out of phase, but the Yh components will be in phase for still or moving scenes.

The final luminance signal having both low and high frequencies is obtained at an output terminal T3 by coupling the output OS1 of the subtractor S1 to one input of an adder A4 via a 1H compensating delay 14 and connecting the output of A3 to another input of A4.

Figure 2:
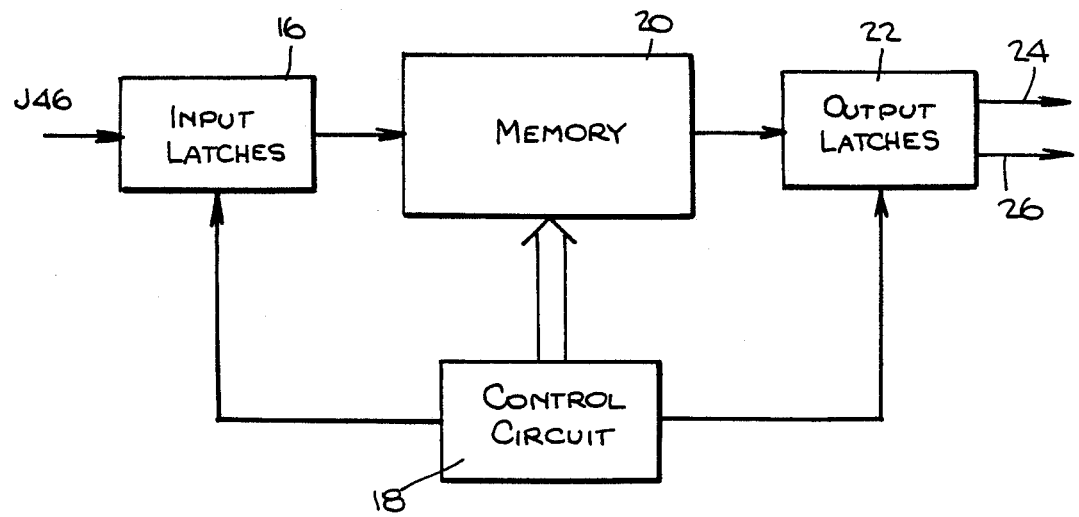
FIG. 2 is a drawing illustrating a practicable embodiment of the invention.

As is well known by those skilled in the art, analog delay lines 6 and 8 that provide delays of 312H and 312H plus or minus one pixel are impractical. Such long delays are practically supplied by writing data into a memory and reading it out at an appropriate subsequent clock count as illustrated in FIG. 2 wherein the video signals at the junction J46 are applied to input latches 16 under the control of clock pulses supplied by a control circuit 18 having a frequency equal to four times the subcarrier frequency and then written into a field memory 20 at the same rate. Thus each pixel or each quarter cycle of a subcarrier is stored at a respectively different address.

In order to supply the signals to the subtractor S2 so as to derive a color signal, the junction J46 is connected to its plus input and the pixel that occurred 312×1135 pixels earlier is read from the memory 20 and applied via output latches 22 and an output 24 thereof to the minus output of S3.

In order to supply the appropriate video signals to the junction 8,10, the signals stored at 1135×624 plus or minus 1 previous clock counts is read from the memory 20 via the output latches 22 so as to appear at an output 26.

In view of the fact that the decoding system is linear, a number of different arrangements of the components illustrated in FIG. 1 are possible. The positions of A1 and S3 can be switched if a 625H delay is substituted for the delay 14 so as to compensate for the fact that the high frequency luminance signals would be delayed by a frame interval. A high pass filter can be inserted between the adder A3 and A4 so that all video frequencies are processed by the part of the system prior to A3 if a low pass filter and a 1H delay are connected between the terminal T1 and the other input of A4. A combination of the latter two alternatives can be used in which the positions of A1 and S3 are interchanged and the high pass filter is located between A3 and A4. Still another alternative is the positioning of the high pass filter at the output of A2 in which case a low pass filter and a 1H delay would be inserted between the input terminal T1 and an input of A4, and the subtractor S1 would not be needed. Also, the high pass filter could be placed at the output of A2 and the position of A1 and A3 exchanged if a low pass filter and a 626H delay were inserted between T1 and A4.

The purpose of the 1H delay 14 of FIG. 1 and in the alternatives noted above is to make the high and low fequencies of the luminance signal Y have as close to their original relationship as possible. In FIG. 1 the high frequencies Yh at the output 0A1 are from like points on two adjacent lines, and they are two lines farther apart at the inputs of the adder A3 because of the delay 12. Thus the average total delay is 1.5H vertically. Accordingly, the delay 14 could be between 1H as shown and 2H.

Whatever arrangement is used the delay 4 and A1 are a means for providing the sum of at least the high frequency components Yh of the luminance signal and color difference signals of one polarity, the delays 6,8,10 and the subtractor S3 are means for providing color difference signals of the opposite polarity so that the color difference signals tend to cancel in the adder A2, the delay 12 and A3 are a two line summing delay that cancels any color difference signals that may appear at the output of the adder A2 because of motion, and the adder A4 combines the low and high frequency components of the luminance signal Y.

We claim:

1. A method for decoding a luminance signal from a PAL composite signal including luminance signals and chrominance signals occurring along interleaved lines of successive fields of successive frames comprising the steps of adding signals for corresponding first pixels on respectively adjacent lines of a field so as to derive first sum signals, obtaining the differences between signals for second pixels that are respectively adjacent said first pixels and which occur during an adjacent frame so as to derive difference signals, inverting the polarity of said difference signals at a rate equal to twice the frequency of said color subcarrier so as to derive modified difference signals, adding said first sum signals and said modified difference signals so as to derive second sum signals, delaying the second sum signals by two lines so as to produce delayed second sum signals, and adding said second sum signals and the delayed second sum signals so as to produce decoded luminance signals.

2. The method as set forth in claim 1 further comprising the steps of limiting the signals subjected to the steps above to the frequencies of the chrominance signals, and adding the frequencies of the PAL composite signal that lie outside of said chrominance frequencies to said decoded luminance signals.

3. Apparatus for decoding a luminance signal from a PAL composite signal including luminance signals and chrominance signals occurring along lines of successive fields of successive frames comprising a source of PAL composite signals, first selection means coupled to said source for selecting signals for corresponding first pixels along adjacent lines of a field, first adding means coupled to said latter means for adding signals for said first pixels so as to produce first sum signals, second selection means coupled to said source for selecting signals for second pixels adjacent to said first pixels that occur during the next frame, subtraction means coupled to said latter means for deriving difference signals that are the differences between the signals selected thereby.

inverting means coupled to said subtraction means for inverting the polarity of said difference signals at a rate equal to twice the frequency of said subcarrier so as to derive modified difference signals, means coupled to said first adding means and to said subtraction means so as to receive said modified difference signals for deriving second sum signals equal to the sum of said first sum signals and said modified difference signals, means coupled to said latter means for delaying said second sum signals by two lines, and second adding means for adding said second sum signals and the delayed second sum signals so as to produce decoded luminance signals.

4. Apparatus as set forth in claim 3 further comprising a high pass filter for selecting the chrominance signal band coupled between said source and said first and second selection means, a low pass filter coupled to said source for selecting frequencies band below said chrominance signal band, and means for adding the low frequency signals passed by said low pass filter to the decoded luminance signals produced by said second adding means.

5. Apparatus for deriving luminance signals from a composite PAL signal having a luminance signal and a color subcarrier occurring along interleaved lines of pixels of successive fields of successive frames in such manner as to reduce the effects of the subcarrier on the luminance signal comprising signal input means for a composite PAL signal, filtering means coupled to said signal input means for providing the high frequency components of a PAL signal to a first output and the low frequency components to a second output, means coupled to said first output for deriving first sum signals equal to the sum of signals for corresponding first pixels of adjacent lines of a field, means coupled to said first output for deriving difference signals equal to the difference between signals, for second pixels respectively adjacent to said first pixels that occur during another frame, means for inverting the polarity of said difference signals at a rate equal to twice the frequency of the color subcarrier, means coupled to said means for deriving said first sum signals and to said means for deriving at said inverted difference signals for producing signals at a third output equal to the sum of said first sum signals and said inverted difference signals, means coupled to said third output for producing said second sum signals at a fourth output with delay of two lines, means coupled to said third and fourth outputs for producing at a fifth output the sums of the signals at said third and fourth outputs, and means for adding the signals at said second and fifth outputs.

6. Apparatus as set forth in claim 5 wherein said meas for deriving said first sum signals is comprised of means coupled to said first output for providing the signals thereat with a delay of one line and means for adding the signals thus delayed and the signals at said first output.

7. Apparatus as set forth in claim 5 wherein said means for deriving said difference signals is comprised of subtracting means having two inputs and an output, one of said inputs being coupled to said first output of said filtering means, means for providing a delay that differs by one pixel from a frame coupled between said first output of said filtering means and the other input of said subtracting means, and means for providing a delay of one line connected between the inputs of said subtraction means.

8. Apparatus for decoding a luminance signal from a composite PAL signal having a luminance signal and a modulated color subcarrier occurring along the lines of interlaced fields of successive frames, comprising a terminal to which a PAL composite signal may be applied, a high pass filter, a first delay of one line, a delay of 312 lines, a delay that differs by one quarter of a period of a cycle of the color subcarrier frequency from 312 lines, and a second delay of one line connected in series in the order named to form a series of elements having junctions therebetween, a first subtractor having one input connected to said terminal, another input connected to the junction of said high pass filter and said first delay of one line and an output, a first adder having one input connected to the junction of said high pass filter and said first delay of one line, another input connected to the junction of said first delay of one line and the delay of 312 lines and an output, a second subtractor having one input connected to the junction of the delay that differs by one quarter of a period of the subcarrier frequency from 312 lines and the second delay of one line, another input connected to the end of said second delay of one line that is remote from said latter junction, and an output, means for reversing the connections of the inputs of said second subtractor at a frequency equal to twice the frequency of the subcarrier, a second adder having one input connected to the output of said first adder, another input connected to the output of said second subtractor and an output, a delay of two lines having an input connected to the output of said second adder, a third adder having an input connected to the output of said second adder, another input connected to the output of said delay of two lines an an output, and a fourth adder having an input connected to the output of said subtractor, an input connected to the output of said third adder and an output at which the desired luminance signal appears.

9. Apparatus as set forth in claim 8 further comprising:

a third subtractor having one input connected to the junction of said first delay of one line and said delay of 312 lines, another input connected to the junction of said latter delay and the delay of 312 lines within one quarter of a period of a cycle of the color subcarrier frequency and an output at which a color signal appears.

* * * * *